United States Patent
Price Hoelscher et al.

(10) Patent No.: US 11,814,901 B2
(45) Date of Patent: Nov. 14, 2023

(54) CONDUCTIVE WELLBORE FLUIDS AND/OR FILTERCAKES, WELLBORE FLUIDS FOR PRODUCING THE SAME, AND METHODS OF USE THEREOF

(71) Applicant: M-I L.L.C., Houston, TX (US)

(72) Inventors: Brandi Katherine Price Hoelscher, Houston, TX (US); Cara Bovet, Houston, TX (US); Albert Okhrimenko, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 188 days.

(21) Appl. No.: 16/097,821

(22) PCT Filed: May 3, 2017

(86) PCT No.: PCT/US2017/030719
§ 371 (c)(1),
(2) Date: Oct. 30, 2018

(87) PCT Pub. No.: WO2017/192642
PCT Pub. Date: Nov. 9, 2017

(65) Prior Publication Data
US 2019/0136114 A1  May 9, 2019

Related U.S. Application Data

(60) Provisional application No. 62/435,475, filed on Dec. 16, 2016, provisional application No. 62/435,454, (Continued)

(51) Int. Cl.
*E21B 49/00* (2006.01)
*E21B 21/00* (2006.01)
(Continued)

(52) U.S. Cl.
CPC ........... *E21B 49/00* (2013.01); *E21B 7/00* (2013.01); *E21B 21/003* (2013.01); *E21B 33/138* (2013.01); *E21B 47/12* (2013.01)

(58) Field of Classification Search
CPC ... C09K 8/02; C09K 8/34; C09K 8/32; C09K 8/36; C09K 8/502; C09K 8/565;
(Continued)

(56) References Cited

U.S. PATENT DOCUMENTS 2,717,239 A    9/1955   Fischer
2,749,503 A    6/1956   Henri-georges
(Continued)

FOREIGN PATENT DOCUMENTS

WO    2000041480 A2    7/2000
WO    2008083049 A2    7/2008
(Continued)

OTHER PUBLICATIONS

International Preliminary Report on Patentability issued in International patent application PCT/US2017/030719 dated Nov. 6, 2018, 11 pages.
(Continued)

*Primary Examiner* — Aiqun Li
(74) *Attorney, Agent, or Firm* — Jeffrey D. Frantz

(57) ABSTRACT

A method of performing a wellbore operation may include circulating an oil-based wellbore fluid having a conductive material therein within a wellbore, the oil-based wellbore fluid having a conductivity of at most 0.02 S/m when measured at 20 kHz; and forming a filtercake having a conductivity at least two orders of magnitude higher than the oil-based wellbore fluid on at least a portion of a wall of the wellbore.

19 Claims, 2 Drawing Sheets

Related U.S. Application Data filed on Dec. 16, 2016, provisional application No. 62/435,384, filed on Dec. 16, 2016, provisional application No. 62/435,404, filed on Dec. 16, 2016, provisional application No. 62/435,510, filed on Dec. 16, 2016, provisional application No. 62/331,332, filed on May 3, 2016, provisional application No. 62/331,317, filed on May 3, 2016, provisional application No. 62/331,298, filed on May 3, 2016.

(51) Int. Cl.
  *E21B 7/00* (2006.01)
  *E21B 33/138* (2006.01)
  *E21B 47/12* (2012.01)

(58) Field of Classification Search
  CPC .......... C09K 8/64; C09K 8/82; E21B 21/003; E21B 33/138; E21B 49/003
  See application file for complete search history.

(56) References Cited

U.S. PATENT DOCUMENTS

| | | | |
|---|---|---|---|
| 3,559,735 | A | 2/1971 | Corrin |
| 5,080,773 | A | 1/1992 | Tatum |
| 5,902,517 | A | 5/1999 | Thielen |
| 6,770,603 | B1 | 8/2004 | Sawdon et al. |
| 2004/0116303 | A1 | 6/2004 | Thaemlitz |
| 2006/0225880 | A1 | 10/2006 | Radzinski et al. |
| 2008/0173481 | A1 | 7/2008 | Menezes et al. |
| 2010/0126252 | A1* | 5/2010 | Bailey .............. G01N 11/14 73/54.28 |
| 2011/0111988 | A1 | 5/2011 | Ionescu Vasii et al. |
| 2011/0254553 | A1 | 10/2011 | Van Zanten |
| 2012/0131996 | A1 | 5/2012 | Anish et al. |
| 2013/0030707 | A1 | 1/2013 | Tabarovsky et al. |
| 2013/0112409 | A1 | 5/2013 | Baleno et al. |
| 2015/0284619 | A1 | 10/2015 | Hoelscher et al. |
| 2015/0368539 | A1 | 12/2015 | Tour et al. |
| 2016/0017201 | A1 | 1/2016 | Yang |
| 2016/0356919 | A1 | 12/2016 | Jamison et al. |
| 2017/0096593 | A1 | 4/2017 | Step et al. |

FOREIGN PATENT DOCUMENTS

| | | |
|---|---|---|
| WO | 2011050061 A2 | 4/2011 |
| WO | 2014/066295 A1 | 5/2014 |
| WO | 2015/148793 A1 | 10/2015 |
| WO | 2016014512 A1 | 1/2016 |
| WO | 2016014525 A1 | 1/2016 |
| WO | 2017/192646 A1 | 11/2017 |
| WO | 2017/192652 A1 | 11/2017 |
| WO | 2017/192656 A1 | 11/2017 |

OTHER PUBLICATIONS

International Preliminary Report on Patentability issued in International patent application PCT/US2017/030727 dated Nov. 15, 2018, 15 pages.
International Preliminary Report dated on Patentability issued in International patent application PCT/US2017/030733 dated Nov. 6, 2018, 12 pages.
International Preliminary Report on Patentability issued in International patent application PCT/US2017/030740 dated Nov. 6, 2018, 7 pages.
International Search Report and Written Opinion for the equivalent International patent application PCT/US2017/030719 dated Aug. 10, 2017.
International Search Report and Written Opinion for the equivalent International patent application PCT/US2017/030740 dated Aug. 16, 2017.
International Search Report and Written Opinion for the equivalent International patent application PCT/US2017/030727 dated Aug. 17, 2017.
International Search Report and Written Opinion for the equivalent International patent application PCT/US2017/030733 dated Aug. 17, 2017.
Office Action issued in U.S. Appl. No. 16/099,160 dated Apr. 13, 2021, 13 pages.
Notice of Allowance issued in U.S. Appl. No. 16/097,825 dated Jul. 9, 2021, 12 pages.
Exam Report letter issued in United Kingdom Patent Application No. GB1819688.1 dated Jul. 20, 2021, 5 pages.
ISO 8942: 2020 "Rubber compoundng ingredients—Carbon black—Determination of individual pellet rushing strength" <https://www.iso.org/obp/ui/>, accessed Oct. 8, 2020.

* cited by examiner

CONDUCTIVE WELLBORE FLUIDS AND/OR FILTERCAKES, WELLBORE FLUIDS FOR PRODUCING THE SAME, AND METHODS OF USE THEREOF

BACKGROUND

The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formation penetrated by the well in addition to other important properties of the well. For example, during logging wireline logs may use measurements of relative resistivity of the formation to determine the geological composition of the downhole formation. Thus, electrical logs and other wireline log techniques are depended upon in the oil and gas exploration industry to determine the nature of the geology and the reservoir properties of the petroleum bearing formations penetrated by the well. Further, wireline well logs are often the only record of a formation penetrated by a well that are available for correlation amongst different wells in a particular field.

When an electrical wireline log is made of a well, electrodes on the well logging tool are in contact with the wellbore fluid or filter cake and hence the formation rocks through which the well has penetrated. An electrical circuit is created, and the resistance and other electrical properties of the circuit may be measured while the logging tool is retracted from the well and/or pulled across the surface of the wellbore. In conventional wellbore logging, the measurement of resistivity requires the presence of a highly conductive path between the logging tool and the formation (i.e., through the wellbore fluid). The resulting data is a measure of the electrical properties of the drilled formations versus the depth of the well. The results of such measurements may be interpreted to determine the presence or absence of petroleum or gas, the porosity of the formation rock, and other important properties of the well.

An alternative or supplement to wireline logging involves logging tools placed in a specialized drill collar housing and run in the drill string near the bit. This technique is known as logging-while-drilling (LWD) or formation-evaluation-while-drilling (FEWD). Measurements such as electrical resistivity may be thereby taken and stored down-hole for later retrieval during a "tripping out" of the drill string, or transmitted to the surface via mud-pulse telemetry. Such techniques are known to one of skill in the art of well drilling and subterranean well logging.

SUMMARY

In one aspect, the embodiments disclosed herein relate to a method of performing a wellbore operation which may include circulating an oil-based wellbore fluid having a conductive material therein within a wellbore, the oil-based wellbore fluid having a conductivity of at most 0.02 S/m when measured at 20 kHz; and forming a filtercake having a conductivity at least two orders of magnitude higher than the oil-based wellbore fluid on at least a portion of a wall of the wellbore.

In another aspect, embodiments disclosed herein relate to a wellbore fluid that may include an oil-based fluid; and a conductive carbon material having surface area loading factor between about 2000 and 4500 lbm$^2$/gbbl.

In yet another aspect, embodiments disclosed herein relate to a wellbore fluid that may include an oil-based fluid; and a conductive carbon material present in the wellbore fluid in an amount of about 1 to 30 pounds per barrel; wherein the wellbore fluid has a plastic viscosity of about 15-70 cP and a yield point of less than about 35 lb/100 ft$^2$.

In yet another aspect, embodiments disclosed herein relate to a method of performing a wellbore operation which may include circulating a wellbore fluid into a wellbore; wherein the wellbore fluid may include: an oil-based fluid; and a conductive carbon material; wherein the wellbore fluid has surface area loading factor between about 2000 and 4500 lbm$^2$/gbbl.

DETAILED DESCRIPTION

Figure 1:
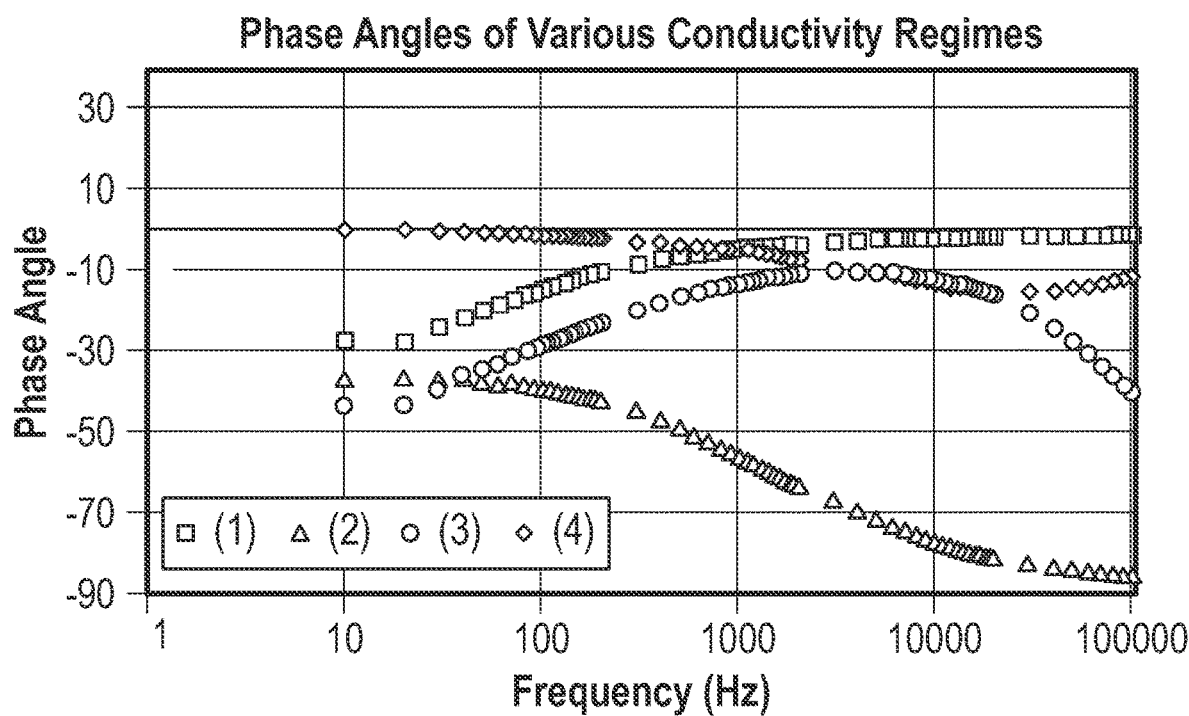
FIG. 1 shows phase angle data for various fluids.

Embodiments disclosed here generally relate to electrically conductive oil-based wellbore fluids and/or electrically conductive filtercakes produced from oil-based wellbore fluids. More specifically, embodiments disclosed herein relate to methods for creating or improving the conductivity in a well drilled with or containing oil-based wellbore fluids and/or filtercakes. In some embodiments, wellbore fluids disclosed herein may be an oil-based wellbore fluid, such as an invert emulsion or a high internal phase ratio (HIPR) emulsion containing an aqueous discontinuous phase and an oil-based continuous phase. More specifically, embodiments disclosed herein relate to wellbore fluids containing additives, and methods for obtaining such wellbore fluids, whereby the additives increase the conductivity of the wellbore fluid and/or the filtercake formed on the wellbore walls by the fluid, thereby allowing for electrical logging of the subterranean well.

The use of oil-based muds and wellbore fluids has become increasingly popular since the introduction of the technology in the 1950's. Innovations in oil-based muds and wellbore fluids are of ongoing importance with the development of environmentally friendly wellbore fluids and fluids having other special characteristics. Oil-based muds offer advantages over water-based muds in many drilling situations. In particular, oil-based muds are known in the art to provide excellent shale inhibition, borehole stability, lubricity, thermal stability, tolerance of contamination, and ease of maintenance. However, oil-based muds and wellbore fluids also have some disadvantages. One disadvantage is that normal resistivity cannot be taken when the well has been drilled with a conventional oil-based mud or wellbore fluid due to the non-conductive nature of the oil-based wellbore fluids and muds. Said another way, when invert emulsion fluids are used, any electrical path through the fluid is highly resistive due to the nature of the external oil phase. The resistive nature of oil-based wellbore fluids severely limits the amount and clarity of resistivity information that may be gathered from a wellbore using wireline logging, while also requiring the use of high frequencies for the measurements (10 Mhz to 100 Mhz).

In the present disclosure, certain details are set forth such as specific quantities, concentrations, sizes, etc. so as to provide a thorough understanding of the various embodiments disclosed herein. However, it will be apparent to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

The oil-based wellbore fluids of the present disclosure may include fluids that are substantially comprised of an oleaginous liquid, as well as emulsions of oleaginous and non-oleaginous fluids. In particular, various embodiments of the present disclosure may provide for an invert emulsion wellbore fluid. "Invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

In the process of rotary drilling a well, a wellbore fluid or mud is circulated down the rotating drill pipe, through the bit, and up the annular space between the pipe and the formation or steel casing, to the surface. The wellbore fluid performs many different functions. For example, it removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximizes penetration rate, etc. An important objective in drilling a well is also to secure the maximum amount of information about the type of formations being penetrated and the type of fluids or gases in the formation. This information is obtained by analyzing the cuttings and by electrical logging technology and by the use of various downhole logging techniques, including electrical measurements.

Various logging and imaging operations are performed during the drilling operation, for example, they may be performed after drilling sections in the reservoir region of an oil/gas well in order to determine the type of formation and the material therein. Such information may be used to optimally locate the pay zone, i.e., where the reservoir is perforated in order to allow the inflow of hydrocarbons into the wellbore.

Some logging tools work on the basis of a resistivity contrast between the fluid in the wellbore (wellbore fluid) and that already in the formation. These are known as resistivity logging tools. Briefly, alternating current flows through the formation between two electrodes. Thus, the fluids in the path of the electric current are the formation fluids and the fluid that has penetrated the formation by way of filtration. The filtercake and filtrate result from filtration of the mud over a permeable medium (such as formation rock) under differential pressure.

The use of resistivity logging tools is often limited to cases where a water-based wellbore fluid is used for the drilling operations because the low conductivity of the base-oil in the case of oil/synthetic-base wellbore fluids precludes the use of resistivity tools in such fluids. The case is similarly true for invert emulsion wellbore fluids, since when invert emulsion fluids are used, any electrical path through the fluid is insulated due to the non-conductive nature of the external oil phase. In other words, even though the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. The non-conductive nature of invert emulsion wellbore fluids severely limits the amount and clarity of resistivity information that may be gathered from a wellbore using wireline logging.

In one or more embodiments, oil-based wellbore fluids, including oil-based fluids such as invert emulsions, may be made conductive by the addition of carbon materials. These conductive oil-based fluids may be used in conjunction with resistivity logging tools in order to log a wellbore. In some embodiments, the methods may include placing oil-based wellbore fluids into the subterranean well and forming a conductive filtercake on the wellbore walls. Some embodiments of the present disclosure may allow for formation of a conductive filtercake that enables electrical logging even if the fluid from which the filtercake is formed is not conductive at a level that permits logging. Specifically, the oil-based wellbore fluids may include one or more carbon materials of the present disclosure in a concentration so as to permit or improve the electrical logging of the well by increasing the electrical conductance of the fluid itself and/or the filtercake formed therefrom. Thus, some embodiments include the drilling of a subterranean well with an oleaginous-based wellbore fluid described herein so as to allow formation of a conductive filtercake by filtration of a portion of the fluid phase into a permeable formation. In such embodiments, the oleaginous-based wellbore fluids of the present disclosure may be formulated so as to enable one to take electrical log measurements of the subterranean well, despite the low conductivity of the base fluid itself.

In some embodiments, during logging and while using oil-based wellbore fluids and carbon materials as described herein, logs may be used to take measurements of relative resistivity of the formation. The measurements of relative resistivity of the formation may be used to determine the geological composition of the downhole formation. In some embodiments, the wellbore fluids and carbon materials disclosed herein may be used with drilling systems having a logging tool provided thereon so that the drilling and formation data and parameters may be determined from various downhole measuring devices and may be measured and then transferred to the surface.

Carbon Materials

While there have been previous attempts to increase the conductivity of an oil-based fluid, such attempts heretofore have resulted in fluids that are not, in fact, usable in a drilling application. Specifically, in some instances, the loading requirements for the conductive particles exceeded pumpability/rheological requirements, while in others, the particles failed to disperse and remain suspended in the fluid. In contrast, the present inventors have advantageously found that the inclusion of the carbon materials of the present disclosure may allow for formation of a conductive wellbore fluid and/or a conductive filtercake at particle loading levels that enable formulation of a wellbore fluid that meets the rheological profile window suitable for use in drilling. Furthermore, it is also envisioned that the same or similar results may be achieved with non-carbon materials with characteristics similar to those detailed below but formed of other elements or having a composition that contains elements other than carbon. However, in particular embodiments of the present disclosure, the fluid may incorporate one or more carbon materials in a wellbore fluid in such an amount that the oil-based filtercake formed therefrom is electrically conductive. Further, it is also envisioned that such materials may be added in an amount to also make the fluid itself conductive, which might be used, for example, in low permeability formations that have minimal filtercake formed. In one or more embodiments, at least two grades of carbon materials, each having different characteristics (e.g., particle size, surface area, pore volume, surface chemistry, etc.) may be used in wellbore fluids of the present disclosure in order to render the wellbore fluid itself or a filtercake formed therefrom conductive. The carbon materials described herein may be added to any oil-based wellbore fluid, or a custom wellbore fluid formulation may be prepared.

Carbon materials in accordance with embodiments of the present disclosure may be carbon black, a particulate form of carbon that has high surface area and only short to medium range intraparticulate ordering (i.e., paracrystalline ordering) of a graphite-like carbon lattice, and in particular the materials may be conductive carbon black. Generally, carbon black may have a morphology that includes primary aggregates of a plurality of primary particles. Specifically, carbon black aggregates are characterized as discrete and rigid masses of physically fused primary particles. These primary aggregates may be provided in the form of larger agglomerates which are subsequently broken down into the primary aggregates upon shearing during the formulation into the wellbore fluids of the present disclosure.

The electron transport between primary aggregates (and thus conductivity) may occur when the distance between the primary aggregates is short enough to form conductive paths allowing electron transport. Increasing particle loading would eventually result in particle-to-particle contact and thus greater conductivity by virtue of the physical contact between particles; however, contrary to this conventional wisdom, the inventors of the present disclosure have found that a conductive fluid and/or a conductive filtercake may be formed from a lower particle loading, which allows for formulation of a fluid that meets downhole drilling requirements. Some of the primary parameters that impact the conductivity efficiency (and ability to achieve conductivity in the fluid and/or the filtercake at a lower loading) include, for example, primary particle size, structure, and porosity. Both particle size and porosity impact surface area. The inventors of the present application have found that by increasing the porosity and the surface area, greater conductivity efficiency (and lower particle loading) may be achieved.

Specifically, in one or more embodiments, the carbon black materials of the present disclosure may be added to the wellbore fluid (and result in a conductive filtercake) in a total amount that ranges from about 0.5 to 30 pounds per barrel (1.43 to 85.59 kg/m$^3$, or in a total amount from about 1 to 25 pounds per barrel (2.85 to 71.33 kg/m$^3$), or in a total amount from about 1.5 to 20 pounds per barrel (4.275 to 57.06 kg/m$^3$). In more particular embodiments, the carbon black materials of the present disclosure may be added to the wellbore fluid (and result in a conductive filtercake) in a total amount that range from about 1 to 8 pounds per barrel (2.85 to 22.8 kg/m$^3$) or in a total amount from about 1.5 to 7.0 pounds per barrel (4.275 to 21.375 kg/m$^3$), or in a total amount from about 2 to 6 pounds per barrel (5.71 to 17.12 kg/m$^3$). Generally, the inventors have found that when working within lower permeability formations a higher loading level of carbon black materials may be needed to achieve the necessary logging conditions.

As mentioned above, the carbon black aggregates may be formed from a plurality of physically fused primary particles. In one or more embodiments, the primary particles are non-spheroidal and in fact, have an egg-shell particle form that is similar to an open shell or a hollow shell. For example, the interior of the shell may be completely enclosed by the shell or there may only be a partial shell surrounding the interior. The "effective" diameter of the carbon black primary particles may be from about 5 nm to about 150 nm or from about 20 nm to about 115 nm.

The primary particles fuse together during production of the carbon black in the oven/furnace to form aggregates that may have a branched and fibroid-like structure, which may further entangle to form the agglomerate. In one or more embodiments, a circumscribing sphere encompassing a carbon black aggregate of the present disclosure may have a diameter from about 60 nm to 3 micrometers. In one or more embodiments, a circumscribing sphere encompassing a carbon black agglomerate of the present disclosure may have a diameter between about 1 micrometer and 5 millimeters in size.

The branched and fibroid-like structure (as well as egg-shell primary particle structure) may result in a relatively high pore volume, particular when considering the size of the aggregates. In one or more embodiments, a carbon black according to the present disclosure may have a pore volume, when measured using Di-Butyl-Phthalate (DBP) absorption method, of at least about 200 cm$^3$ DBP/100 g carbon black and up to about 500 cm$^3$ DBP/100 g carbon black. Carbon black aggregates with these values have a low bulk density and a highly branched structure, which may serve to provide better contact between aggregates and therefore a better three dimensional network of conductive aggregates at lower loadings in a filtercake (and thus a fluid that forms the filtercake).

The egg-shell primary particle structure also contributes to a higher surface area for the aggregates. In one or more embodiments, the carbon black may have a surface area between about 125 and 1500 m$^2$/g. In more particular embodiments, the carbon black may have a surface area of at least about 200 m$^2$/g, or at least about 500 m$^2$/g, or at least about 700 m$^2$/g, or at least about 800 m$^2$/g, or at least about 900 m$^2$/g, or at least about 1000 m$^2$/g, or at least about 1100 m²/g, or at least about 1200 m²/g, or at least about 1300 m²/g, or at least 1400 m²/g and/or up to 1500 m²/g.

Collectively, the high pore volume and high surface area may allow for greater conductivity efficiency. This efficiency may be represented by the value of the loading multiplied by the surface area of the carbon materials, a number which may be hereinafter referred to as the "surface area loading factor". In one or more embodiments, wellbore fluids of this disclosure have a value of the loading (in pounds per barrel) multiplied by the surface area (in m²/g) of the carbon materials of at least 2000 lbm²/gbbl, or at least 2250 lbm²/gbbl, or at least 2500 lbm²/gbbl, or at least 2750 lbm²/gbbl, or at least 3000 lbm²/gbbl. In one or more embodiments, wellbore fluids of this disclosure have a value of the loading (in pounds per barrel) multiplied by the surface area (in m²/g) of the carbon materials of at most 4500 lbm²/gbbl, or at most 4000 lbm²/gbbl. Such a "surface area loading factor" is dependent on both the surface area and loading, and thus theoretically can be achieved by simply increasing the loading. However, as discussed above, the carbon black materials of the present disclosure may be added to the wellbore fluid in a total amount as low as 1 pound per barrel (2.85 kg/m³) with a maximum amount of up to 30 pounds per barrel (85.59 kg/m³), or a maximum amount up to 25 pounds per barrel (71.33 kg/m³), or a maximum amount up to 20 pounds per barrel (57.06 kg/m³), or a maximum amount up to 15 pounds per barrel (42.8 kg/m³), or a maximum amount up to about 10 pounds per barrel (28.53 kg/m³). In more particular embodiments, the carbon black materials of the present disclosure may be added to the wellbore fluid (and result in a conductive fluid and/or filtercake) in a total amount that ranges from about 1 to 8 pounds per barrel (2.85 to 22.8 kg/m³) or in a total amount from about 1.5 to 7.5 pounds per barrel (4.275 to 21.375 kg/m³). It is envisioned that the surface area loading factor discussed above is achieved through the combination of these loading limits and the above discussed surface area limitations. Specifically, as discussed above, in one or more embodiments, the carbon black may have a surface area between about 125 and 1500 m²/g. In more particular embodiments, the carbon black may have a surface area of at least about 200 m²/g, or at least 500 m²/g, or at least 700 m²/g, or at least about 800 m²/g, or at least about 900 m²/g, or at least about 1000 m²/g, or at least about 1100 m²/g, or at least about 1200 m²/g, or at least about 1300 m²/g, or at least 1400 m²/g and/or up to 1500 m²/g.

The surface chemistry of the carbon black may also play a role in their potential conductive properties. Most carbon blacks are known to have surfaces that contain organic surface groups including polyaromatic hydrocarbons (PAH), lactones, chinones, phenolics, and carboxylics, which may be otherwise known as 'volatiles'. Too high of a concentration of these volatiles may act as a barrier for the electron-tunneling effect thought to provide the electroconductivity. In one or more embodiments, carbon black used in the wellbore fluids of the present disclosure may have a volatile content below about 1% by weight, or below about 0.85% by weight, or below about 0.7% by weight.

As mentioned above, the wellbore fluid containing conductive carbon materials may not be as conductive as a filtercake that it forms when used downhole due to the dilution of the carbon materials. For example, when a wellbore fluid is used downhole, a portion of the fluid filters into the formation as a filtrate leaving behind some of the solid or semi-solid materials from the wellbore fluid (e.g., particulate weighting materials, bridging agents, fibers, polymers, etc.) on the face of the formation as a filtercake with some amount of the fluid phase present therein. Thus, as a wellbore fluid containing carbon materials filters into the formation, the carbon materials, being solid, will tend to accumulate in the filtercake that is formed on the formation face. This accumulation may effectively concentrate the conductive carbon materials to a degree where conductivity would exist within the filtercake, where it did not exist in the wellbore fluid itself due to its dilution in the fluid.

In one or more embodiments, the wellbore fluid may have a conductivity of at most 0.02 siemens per meter (S/m), or at most 0.01 S/m, or at most 0.0075 S/m, or at most 0.001 S/m when measured at 20 kHz. In one or more embodiments, the wellbore fluid is at least about 100 times less, or at least about 500 times less, or at least about 1000 times, or at least about 1500 times less, or at least about 2000 times less, or at least about 2500 times less, or at least about 3000 times less conductive than a filtercake produced from the filtration of said wellbore fluid into the formation. In one or more embodiments, the conductivity of the wellbore fluid may be at most 100,000 times less than a filtercake produced from the filtration of said wellbore fluid into the formation. Said another way, the wellbore fluid is at least about 100, 500, 1000, 1500, 2000, 2500, or 3000 times more resistive than a filtercake produced from the filtration of said wellbore fluid into the formation. Further, it is also appreciated that the conductivity/resistivity of a wellbore fluid and/or filtercake may be considered relative to the formation (and the formation fluids) behind the filtercake so that there is enough contrast between the two materials that can be recognized by the logging tool. For example, in one or more embodiments, resistivity logging tools operating at frequencies less than about 50 kHz may provide suitable imaging data when there is up to a 100 fold difference between the resistivity/conductivity of the wellbore fluid and/or filtercake formed on the formation and the formation itself, i.e., the filtercake is up to 100 times more resistive than the formation. However, when using other tools at other operating frequencies or depending on the desired level of image quality, different ranges may be used.

Further, it is relevant that the conductivity exists in the wellbore fluid and/or filtercake without breaking the emulsion. Breaking of the emulsion would independently result in conductivity due to the availability of the aqueous saline phase broken free from the emulsion. However, from a fluid stability perspective, it is not desirable for the emulsion to break (or the mud to fall apart) downhole during drilling and formation of the filtercake. Thus, in one or more embodiments, the filtrate collected from an API HPHT Fluid Loss test on the wellbore fluids of the present disclosure is substantially free of separated water (as compared to emulsified water). Specifically, in one or more embodiments, the filtrate has less than 10 percent of the portion of water in the fluid phase separate following an API HPHT Fluid Loss Test. That is, for an invert emulsion that is 80% oil and 20% water, less than 10% of the 20% water portion may phase separate from the emulsion. In more specific embodiments, the amount of phase separated non-oleaginous fluid in the filtrate is less than about 5% by volume of the amount of non-oleaginous fluid in the original wellbore fluid. Further, it is noted that the API HPHT Fluid Loss test may have at least 1 mL of filtrate collected, which may indicate that a filtercake is formed. In one or more embodiments, the conductivity arises through the formation of a filtercake and therefore, the formation in which the fluid is used should have a permeability at least in the millidarcy range to ensure that a filtercake forms during the wellbore operations. Further, drilling in an overbalanced condition may also aid in formation of a filtercake, depending on the permeability of the formation.

However, some shales have a permeability in the nanodarcy range and a substantial filtercake may not be expected to form during wellbore operations. In these situations and other situations where it would be beneficial for the wellbore fluid itself to be sufficiently conductive for logging, a higher loading (i.e., greater than about 10 pounds per barrel) of carbon materials may be used in the wellbore fluid to increase the conductivity of the fluid itself and thereby enable effective resistivity imaging.

The rheological profile of the fluid is impacted by the degree of loading of the carbon materials. Fluids having carbon materials of the present disclosure incorporated therein may result in sufficient electrical conductivity for the wellbore fluid and/or filtercake while also arriving at acceptable rheological properties for drilling (and pumping downhole). One of ordinary skill in the art will appreciate that the precise rheological profile of a drillable fluid may depend on the formation (whether the formation can tolerate a thicker mud without fracturing), but generally, the fluids having the described carbon black loading may have a plastic viscosity of about 15-70 cP and yield point of less than about 35 lb/100 ft$^2$. Further, the fluid may also have a GELS value ranging from 5-20 lb/100 ft$^2$, the GELS being a measure of the suspending characteristics or the thixotropic properties of a fluid, measured after 10 seconds and/or 10 minutes.

In one or more embodiments, the use of a resistive wellbore fluid (having the conductivity described herein) containing otherwise conductive carbon materials to form a conductive filtercake containing at least some of said conductive carbon materials upon the fluid's injection downhole may allow for beneficial rheological properties to be achieved by the wellbore fluid. For example, the rheological properties may be enhanced as a result of the reduced necessity for high loadings of conductive carbon materials in the fluid in order to make the wellbore fluid itself conductive. The enhanced rheological properties may allow for the wellbore fluid to be easily pumpable, used during a drilling or other wellbore operation, and capable of efficient particle suspension with low sag.

As mentioned above, wellbore fluids described herein may be oil-based wellbore fluids or invert emulsions in one or more embodiments. Suitable oil-based or oleaginous fluids may be a natural or synthetic oil and in some embodiments, in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of oleaginous liquid in the invert emulsion fluid may vary depending upon the particular oleaginous fluid used, the particular non-oleaginous fluid used, and the particular application in which the invert emulsion fluid is to be employed. However, in some embodiments, the amount of oleaginous liquid may be sufficient to form a stable emulsion when used as the continuous phase. In some embodiments, the amount of oleaginous liquid may be at least about 30, or at least about 40, or at least about 50 percent by volume of the total fluid. The amount of non-oleaginous liquid in the invert emulsion fluid may vary depending upon the particular non-oleaginous fluid used and the particular application in which the invert emulsion fluid is to be employed. In some embodiments, the amount of non-oleaginous liquid may be at least about 1, or at least about 3, or at least about 5 percent by volume of the total fluid. In some embodiments, the amount may not be so great that it cannot be dispersed in the oleaginous phase. Therefore, in certain embodiments, the amount of non-oleaginous liquid may be less than about 70, or less than about 60, or less than about 50 percent by volume of the total fluid.

Wellbore Fluid Additives

The wellbore fluids of the present disclosure may further contain additives so long as the additives do not interfere with the properties of the compositions described herein. For example, emulsifiers, wetting agents, organophilic clays, viscosifiers, weighting agents, bridging agents, fluid loss control agents, and corrosion inhibitors may be added to the compositions disclosed herein so as to impart additional functional properties.

Wetting agents and emulsifiers that may be suitable for use include, but are not limited to, crude tall oil, oxidized crude tall oil, surfactants, organic phosphate esters, ether carboxylic acids, fatty amines, amidoamines, modified imidazolines and amidoamines, fatty acid amidoamines (including dry fatty acid amidoamines) and salts thereof, alkyl aromatic sulfates and sulfonates, and the like, and combinations or derivatives of these. VERSAWET™ and VERSACOAT™, NOVAMUL™, FAZEMUL™, FAZEWET™, MEGAMUL™, SUREMUL™, ONEMUL™, ACTIMUL RD™, and MUL-XT™ are non-limiting examples of commercially available emulsifiers manufactured and distributed by M-I, L.L.C. that may be used in the fluids and methods of this disclosure. Other suitable surfactants that are commercially available include SILWET™ series of emulsifiers such as L-77, L-7001, L7605 and L-7622, which are distributed by Union Carbide Chemical Company Inc.

In other embodiments, the emulsifier may be carboxylic acid-based emulsifier such as, for example, an emulsifier selected from dicarboxylic fatty acids, dimer acids, or dimers of fatty acids. Dicarboxylic fatty acids have the general formula HOOC—R—COOH, wherein R is an alkyl or alkenyl group containing from 10 to 50 carbon atoms, and in particular embodiments from 20 to 40 carbon atoms. In other embodiments, emulsifiers may be selected from the dimerization products of unsaturated dicarboxylic fatty acids, for example, such as products prepared by dimerization of unsaturated fatty acids containing from 8 to about 18 carbon atoms, including 9-dodecenoic(cis), 9-tetradecenoic (cis), 9-octadecenoic(cis), octadecatetraenoic acids and the like.

Organophilic clays, normally amine treated clays, may be useful as viscosifiers in the fluid compositions disclosed herein. Other viscosifiers and gellants, such as oil soluble polymers, polyamide resins, polycarboxylic acids and soaps may also be used. Attapulgite clay and sepiolite clay may also be used as viscosifiers. The amount of viscosifier used in the compositions may vary depending on downhole conditions, as understood by those skilled in the art. However, normally about 0.1% to 6% by weight range may be sufficient for most applications. VG-69™, VG-SUPREME™, VG-HT™, and VG-PLUS™ are organoclay available from M-I, L.L.C. (Houston, TX), and VERSA-HRP™ is a polyamide resin material available from M-I L.L.C. (Houston, TX) that may be used in the fluids and methods of this disclosure.

Fluid loss control agents may act by coating the walls of the well. Suitable fluid loss control agents may include, but are not limited to, modified lignites, asphaltic compounds, gilsonite, organophilic humates or tannins prepared by reacting humic acid or tannic acid with amides or polyalkylene polyamines, amine-treated tannins such as ONE-TROL-HT™, and latex polymers. In embodiments, the fluid loss control agent may be selected from one or more of VERSATROL™, VERSATROL™, VERSALIG™, ECOTROL™ family of products, ONETROL-HT™, EMI 789, and NOVATECH™ F, which are all commercially available from MI SWACO (Houston, TX).

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Weighting agents or density materials suitable for use in wellbore fluid formulations in accordance with the present disclosure include, but are not limited to, hematite, magnetite, iron oxides, ilmenite, barite, siderite, celestite, dolomite, calcite, manganese oxides, halites and the like. In other embodiments, the micronized weighting agents may be coated with a dispersant.

In embodiments, the weighting agent may be coated, for example, with dispersants such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used, such as HYPERMER™ OM-1 (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

The quantity of the coated or uncoated weighting agent added, if any, may depend upon the desired density of the final composition. Weighting agents may be added to result in a density of up to about 22 pounds per gallon (ppg). In other embodiments, the weighting agent may be added to achieve a density of up to 20 ppg or up to 19.5 ppg.

The method used in preparing wellbore fluids described herein is not critical. Conventional methods can be used to prepare the wellbore fluids in a manner analogous to those normally used, to prepare conventional oil-based drilling fluids. In one representative procedure, a desired quantity of oleaginous fluid such as a base oil and a suitable amount of carbon black materials are mixed together and the remaining components (if necessary) are added sequentially with continuous mixing. An invert emulsion of the present disclosure is formed by vigorously agitating, mixing or shearing the oleaginous fluid and the non-oleaginous fluid.

Wellbore Fluid Use Downhole

In one or more embodiments, the wellbore fluids described herein may be pumped and circulated downhole while drilling with overbalanced conditions or during another wellbore operation. During the circulation or drilling a conductive filtercake may be formed on the wellbore walls. Drilling/circulating the fluid in overbalanced conditions may include a pressure differential of at least 150 psi and up to the fracture gradient of the formation, such that a filtercake is formed on the walls of the formation. This conductive filtercake may be useful for performing resistivity measurements on the formation in order to characterize the reservoir. Thus, during and/or following the circulation, a logging tool may be used in the wellbore to perform resistivity measurements.

EXAMPLES

Example 1

Phase angle in different conductivity regimes were measured on four fluids: (1) a NaCl brine, (2) a stable invert emulsion drilling fluid without carbon black additives, (3) an invert emulsion fluid that has purposefully been broken, and (4) a formulated invert emulsion drilling fluid that has a carbon black additive of the type described above.

FIG. 1 shows the phase angle results for each fluid when measured from 10-100,000 Hz. It can be seen that the data from both the NaCl brine (1) and the broken emulsion fluid (3) create curves that trend upwards with increasing frequency, representing the conductivity behavior of the electrolyte/brine. The data from the stable invert emulsion drilling fluid without carbon black (2) shows a curve that decreases with increasing frequency. The data for the invert emulsion drilling fluid formulated with carbon black (4) shows a similar trend to the stable invert emulsion fluid without carbon black, indicating that the fluid also has a stable emulsion, albeit with a higher conductivity value due to the presence of the carbon black additive.

This data shows that the conductivity of the fluid with carbon black is not due to a broken emulsion due to the differences in the phase angle data for fluid (4), as compared to fluids (1) and (3). Conventionally, as greater amounts of carbon black were added to an invert emulsion, the stability of the emulsion suffered and the emulsion can break, providing for conductivity through the broken emulsion (i.e., exposed aqueous phase), not through the carbon black.

However, the present fluids may achieve conductivity through the carbon black without losing the stability of the emulsion.

Example 2

In this example the conductivity (when measured at 20 kHz) of a fluid and of a filtercake formed by the filtration of the fluid through a simulated formation were compared for two fluid formulations, one that contains no carbon black and an identical formulation that does contain carbon black. The weight of both fluids tested was 12 pounds per gallon and there was no visible water in the filtrate, thereby indicating the stability of the emulsion. The fluids were mixed according to API 131 and aged at 250° F. The general fluid formulation is shown in Table 1 below.

TABLE 1

| Component | Amount (ppb) |
| --- | --- |
| Base Fluid (Diesel) | 184 |
| Organophilic Clay | 1.5 |
| Lime | 8 |
| Emulsifier | 8 |
| 25% CaCl$_2$ Brine | 73 |
| Fluid Loss Control Additive | 2 |
| Barite | 225 |
| OCMA | 35 |

In order to assess the conductivity of a filtercake under high temperature and high pressure (HTHP) conditions a specialized testing cell has been designed. The filtercake conductivity cell is capable of withstanding 500 PSI and 400° F. A filtercake is generated on a conductive permeable medium at a temperature of 250° F. and 500 PSI differential pressure. An electrode is then brought into contact with the filtercake, and the conductivity is measured across the thickness of the cake. Pressure and temperature may be applied to the filtercake while it is on the cell.

Fluid A is the control in that it contains only the components listed above in Table 1 and no carbon black. Fluid B contains the same components as sample A except it also contains 4 pounds per barrel of a carbon material of the type described herein. The rheology details of the two fluids at 150° F. are shown in Table 2 below.

TABLE 2

|  | Fluid A | Fluid B |
| --- | --- | --- |
| 600 RPM | 43 | 43 |
| 300 RPM | 22 | 27 |
| 200 RPM | 14 | 19 |
| 100 RPM | 8 | 12 |
| 6 RPM | 2 | 4 |
| 3 RPM | 1 | 3 |
| 10" Gel | 3 | 5 |
| 10' Gel | 5 | 11 |
| PV | 21 | 16 |
| YP | 1 | 11 |
| API HTHP Fluid Loss (mL) | 1.6 | 8.4 |

Figure 2:
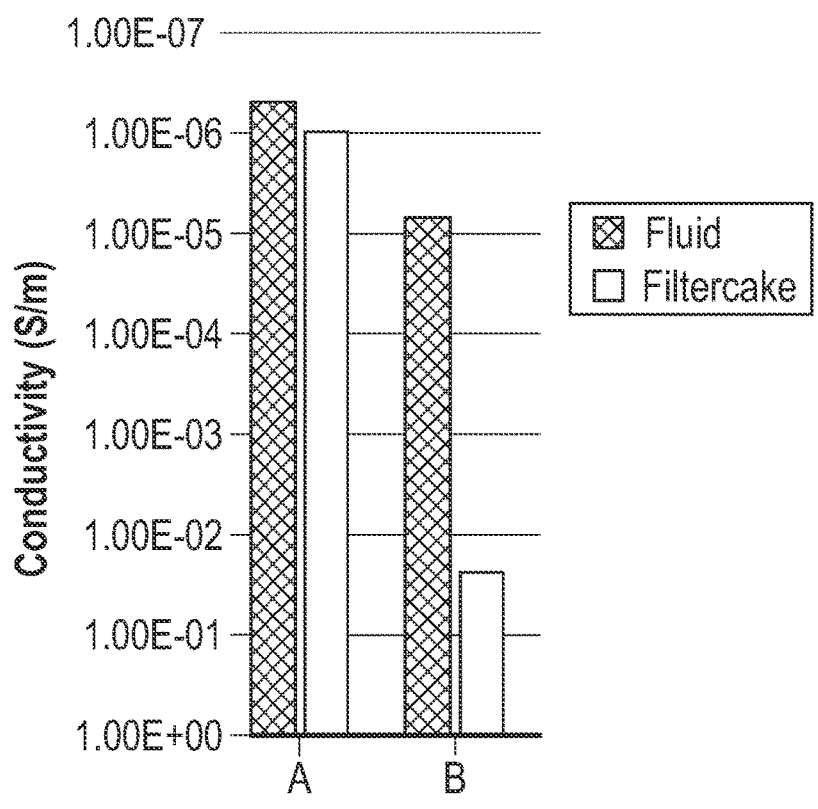
FIG. 2 shows comparative conductivity, measured at 20 kHz, for various fluids of Example 2 and their resulting filtercakes.

As can be seen in the bar graph presented in FIG. 2, the conductivities of the fluid and the filtercake for sample A are comparable. For sample B, it can be seen that the conductivity of the fluid is roughly an order of magnitude higher than the fluid of sample A which did not have any carbon material additives. Further, the filtercake produced by the fluid of sample B is at least two orders of magnitudes higher than that of the fluid that produced it.

Example 3

In this example four fluids were prepared and their rheology and conductivity (when measured at 20 kHz) analyzed. Table 3 shows the formulation details.

TABLE 3

| Component | Amount (ppb) | | | |
| --- | --- | --- | --- | --- |
| | Fluid C | Fluid D | Fluid E | Fluid F |
| Base Fluid (Diesel) | 182 | 182 | 182 | 182 |
| Organophilic Clay | 1.5 | 1.5 | 1.5 | 1.5 |
| Lime | 6 | 6 | 6 | 6 |
| Emulsifier | 10 | 8 | 10 | 10 |
| 25% CaCl$_2$ Brine | 73 | 73 | 73 | 73 |
| Fluid Loss Control Additive | 4 | 4 | 2 | 4 |
| Barite | 222 | 222 | 222 | 222 |
| OCMA | 35 | 35 | 35 | 35 |
| Carbon Black | 2 | 2 | 2 | 2 |
| Rheology Modifier | 2 | 2 | 2 | 0 |
| Filtration Control Additive | 0 | 0 | 2 | 0 |
| Density | 12 ppg | 12 ppg | 12 ppg | 12 ppg |

The rheology details of the two fluids at 150° F. after being aged at 250° F. are shown in Table 4 below.

TABLE 4

|  | Fluid C | Fluid D | Fluid E | Fluid F |
| --- | --- | --- | --- | --- |
| 600 RPM | 110 | 93 | 74 | 128 |
| 6 RPM | 12 | 9 | 7 | 20 |
| 10" Gel | 13 | 9 | 8 | 20 |
| 10' Gel | 13 | 9 | 8 | 20 |
| PV | 38 | 33 | 28 | 44 |
| YP | 34 | 27 | 18 | 40 |
| API HTHP Fluid Loss (mL) | 6.2 | 9.8 | 11 | 8.6 |
| Water in Filtrate (mL) | 0 | 0.6 | 0.4 | 0.4 |

Figure 3:
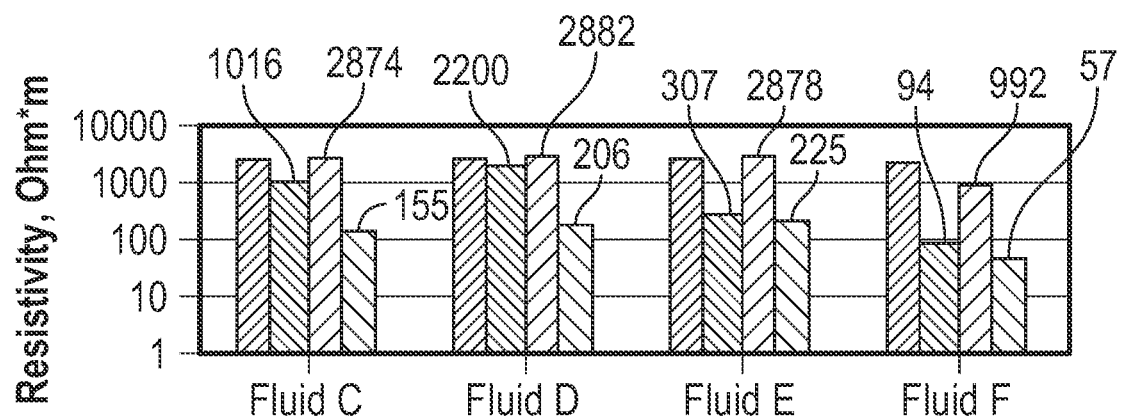
FIG. 3 shows the resistivity of the fluids described in Example 3 under various conditions.

FIG. 3 shows the resistivity of the fluids described above under the following conditions (from left to right): at room temperature after hot rolling at 150° F., at 150° F. after hot rolling at 150° F., at room temperature after hot rolling at 250° F., and at 250° F. after hot rolling at 250° F.

Example 4

In this example, a fluid compositionally the same as Fluid C above, was prepared and subjected to high shear conditions instead of a hot rolling aging treatment. The high shear conditions were generated by passing the fluid through a nozzle and the specifics of the high shear conditions are shown in Table 5 below.

TABLE 5

| Nozzle Diameter | 0.052 in |
| --- | --- |
| Fluid Volume | ~666 mL |
| Fluid Density | 12 ppg |
| Fluid Viscosity | 87 cP |
| Duration of Shear | ~6 sec |
| Average Fluid Velocity | ~3286 in/sec |
| Average Shear | Ksec$^{-1}$ |
| Re | ~1822 Laminar |

The rheology details of the fluid before and after the application of the high shear conditions is shown in Table 6 below.

|  | Before Shear | After Shear |
| --- | --- | --- |
| 600 RPM | 105 | 73 |
| 6 RPM | 15 | 9 |
| 10" Gel | 15 | 9 |
| 10' Gel | 18 | 10 |
| PV | 37 | 27 |
| YP | 31 | 19 |
| API HTHP Fluid Loss (mL) | N/A | 5.2 |
| Water in Filtrate | N/A | 0 |

Figure 4:
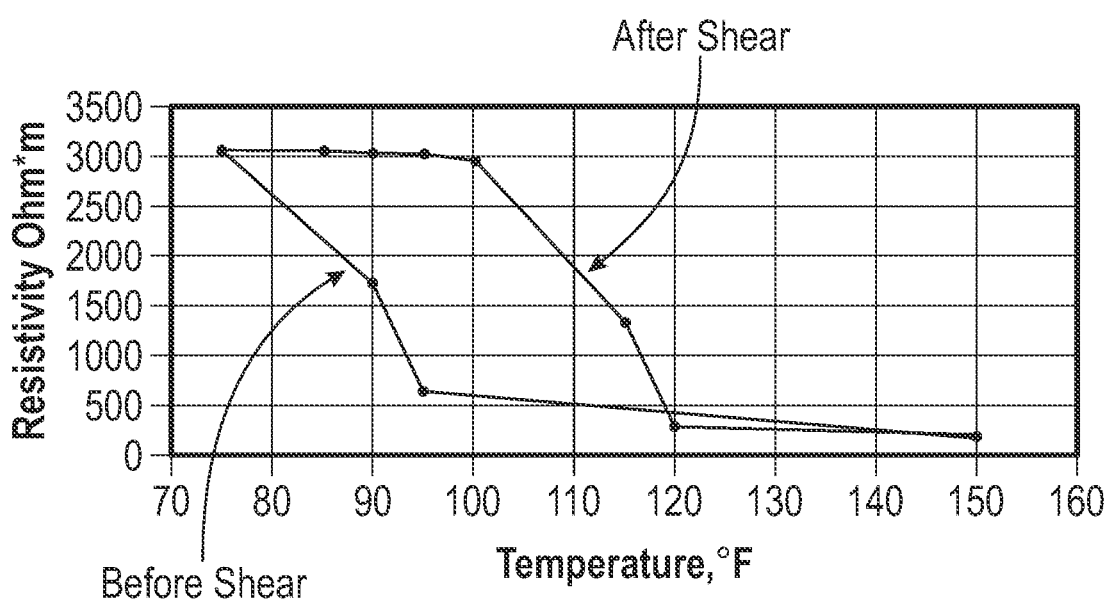
FIG. 4 shows the change in the resistivity of the fluids of Example 4 before and after application of the high shear conditions as a function of temperature.

FIG. 4 shows conductivity activation temperature before and after shear. As seen, the conductivity activation temperature increases after shear. Further, higher shear lowers the rheology and eliminates water from the filtrate.

Although only few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method of performing a wellbore operation comprising:
    circulating an oil-based wellbore fluid having a conductive material therein within a wellbore, the oil-based wellbore fluid having a conductivity of at most 0.02 S/m when measured at 20 kHz, wherein the conductive material is a carbon black having volatile content, wherein the volatile content is below about 1% by weight of the carbon black; and
    forming a filtercake having a conductivity at least two orders of magnitude higher than the oil-based wellbore fluid on at least a portion of a wall of the wellbore; wherein the carbon black has a pore volume of at least about 200 cm$^3$ DBP/100 g carbon black and up to about 500 cm$^3$ DBP/100 g carbon black; wherein the carbon black is present in the wellbore fluid in an amount of 1 to 30 pounds per barrel; wherein the oil-based wellbore fluid has a plastic viscosity of about 15-70 cP and a yield point of less than about 35 lb/100 ft$^2$; wherein a circumscribing sphere encompassing an aggregate of the carbon black has a diameter of up to 3 micrometers;
wherein the oil-based fluid is an invert emulsion comprising an oleaginous and a non-oleaginous fluid; wherein the oleaginous fluid is at least 30 percent by volume of the total oil-based fluid, and wherein the non-oleaginous fluid comprises a 25 wt. % calcium chloride brine solution.

2. The method of claim 1, further comprising: operating a downhole tool in the wellbore.

3. The method of claim 1, wherein the conductive material has a surface area loading factor between about 2000 lbm$^2$/gbbl and about 4500 lbm$^2$/gbbl.

4. The method of claim 3, wherein the surface area loading factor is between 2500 lbm$^2$/gbbl and 4500 lbm$^2$/gbbl.

5. The method of claim 4, wherein the surface area loading factor is between 2500 lbm$^2$/gbbl and 4000 lbm$^2$/gbbl.

6. The method of claim 5, wherein the surface area loading factor is between 3000 lbm$^2$/gbbl and 4000 lbm$^2$/gbbl.

7. The method of claim 1, wherein the circulating is performed under a pressure differential of at least 150 psi.

8. The method of claim 1, wherein the carbon black has non-spheroidal primary particles from about 5 nm to about 150 nm in diameter.

9. The method of claim 1, wherein the conductivity of the oil-based wellbore fluid is at most 0.01 S/m when measured at 20 kHz.

10. The method of claim 9, wherein the conductivity of the oil-based wellbore fluid is at most 0.001 S/m when measured at 20 kHz.

11. The method of claim 10, wherein the conductivity of the oil-based wellbore fluid is less than 0.0001 S/m when measured at 20 kHz.

12. The method of claim 11, wherein the conductivity of the oil-based wellbore fluid is less than 0.00001 S/m when measured at 20 kHz.

13. The method of claim 12, wherein the conductivity of the filtercake is at least three orders of magnitude higher than the oil-based wellbore fluid.

14. The method of claim 1, wherein the volatile content is below about 0.85% by weight of the carbon black.

15. The method of claim 1, wherein the volatile content is below about 0.7% by weight of the carbon black.

16. The method of claim 1, wherein the conductivity of the filtercake is at least 500 times higher than the oil-based wellbore fluid.

17. The method of claim 1, wherein the circulating is performed under a pressure differential of at least 500 psi.

18. The method of claim 1, wherein the conductivity of the filtercake is at least three orders of magnitude higher than the oil-based wellbore fluid.

19. The method of claim 1, wherein the conductive material comprises less than 1% by weight of the oil-based wellbore fluid.

* * * * *